United States Patent [19]

Hatton

[11] Patent Number: 5,021,390

[45] Date of Patent: Jun. 4, 1991

[54] LIQUID HYDROCARBON ABSORBENT COMPOSITION AND METHOD

[76] Inventor: John H. Hatton, 1802 Eucalyptus Ave., Leucadia, Calif. 92024

[21] Appl. No.: 334,293

[22] Filed: Apr. 6, 1989

Related U.S. Application Data

[63] Continuation-in-part of Ser. No. 906,813, Sep. 12, 1986, abandoned.

[51] Int. Cl.$^5$ .............................................. B01J 20/24
[52] U.S. Cl. ....................................... 502/401; 134/6; 208/188; 502/404; 502/411
[58] Field of Search ....................... 502/401, 404, 411; 134/6; 208/188

[56] References Cited

U.S. PATENT DOCUMENTS

| | | | |
|---|---|---|---|
| 1,728,656 | 9/1929 | Brandley. | |
| 3,442,819 | 5/1969 | Herbert | 252/428 |
| 3,527,712 | 9/1970 | Renn et al. | 252/316 |
| 3,591,524 | 7/1971 | Eriksen | 252/427 |
| 3,791,990 | 2/1974 | Fischer | 252/427 |
| 3,870,425 | 3/1975 | Karonis | 404/76 |
| 4,006,094 | 2/1977 | Pellar | 252/194 |
| 4,021,368 | 5/1977 | Nemec et al. | 252/427 |
| 4,199,472 | 4/1980 | Ohtsaka et al. | 252/427 |
| 4,345,973 | 8/1982 | Ladisch et al. | 203/19 |
| 4,525,465 | 6/1985 | Someno et al. | 502/7 |
| 4,576,928 | 3/1986 | Tani et al. | 502/404 |

FOREIGN PATENT DOCUMENTS

| | | |
|---|---|---|
| 859083 | 12/1970 | Canada. |
| 180563 | 5/1986 | European Pat. Off.. |
| 237857 | 7/1978 | Japan. |
| 18239 | 8/1980 | Japan. |
| 159837 | 12/1980 | Japan. |
| 76538 | 1/1984 | Japan. |
| 76539 | 5/1984 | Japan. |
| 74642 | 4/1986 | Japan. |

Primary Examiner—Asok Pal
Attorney, Agent, or Firm—Baker, Maxham, Jester & Meador

[57] ABSTRACT

A composition for absorbing liquids comprises a quantity of fibrous material from plants and coated with a waterproofing composition, such as with sodium methyl silicate some embodiments include organic material derived from at least one substance selected from the group consisting of plant gums and plant mucilages in admixture with particulate plant fibers. The absorbing compositions are applied to hydrocarbon liquids, such as oil and the like on water.

11 Claims, 1 Drawing Sheet

LIQUID HYDROCARBON ABSORBENT COMPOSITION AND METHOD

REFERENCE TO RELATED APPLICATION

The present application is a continuation-in-part of my co-pending application Ser. No. 906,813, filed Sept. 12, 1986, and entitled "FLUID ABSORBENT COMPOSITION AND METHOD", now abandoned.

BACKGROUND OF THE INVENTION

The present invention relates to compositions for the absorption of liquids and methods of use, and pertains particularly to specific materials and methods for the removal of liquids from a supporting medium by the process of absorption.

There are many situations where it is desirable to have suitable materials and methods for the removal of certain liquids, such as oils, greases, acids and the like from surfaces for cleanup purposes. It is also desirable to have absorptive materials that will draw fluids, liquids and residues, such as stains and the like from support surfaces, such as concrete, wood and the like.

Many materials have been proposed for cleaning oil and grease stains from concrete driveways and the like. Many of the materials presently in use include clays and other soils which act to absorb the oils and the like. These materials, however, have not been entirely satisfactory.

Absorbent materials are also desirable for many other uses. Such materials may be useful, for example, for separation of one liquid from another, for storing a liquid, or for combining a liquid or materials contained therein with another material.

It is also desirable that selectively absorbent material be available that will be impervious to one liquid but absorb another. More particularly, it is desirable that materials be available that are impervious to water and yet absorb oils.

Accordingly, it is desirable that an improved absorbent material and method be available.

SUMMARY AND OBJECTS OF THE INVENTION

It is the primary object of the present invention to provide an improved method and material for absorption of liquids and the like.

In accordance with a primary aspect of the present invention, an absorbing composition comprises a quantity of fibrous plant material that is coated with a waterproofing composition that is pervious to oil. Another embodiment includes a quantity of fibrous plant material in admixture with a quantity of organic material derived from plant gums and/or plant mucilages coated with a waterproofing composition that is pervious to oil. In use, a quantity of the absorbing composition is placed in contact with the liquid substance to be removed. In another aspect of the invention, the composition is pervious to oil and impervious to water.

BRIEF DESCRIPTION OF THE DRAWING

The above and other objects and advantages of the present invention will become apparent from the following description when read in conjunction with the accompanying drawing wherein.

DETAILED DESCRIPTION OF A PREFERRED EMBODIMENT

Figure 1:
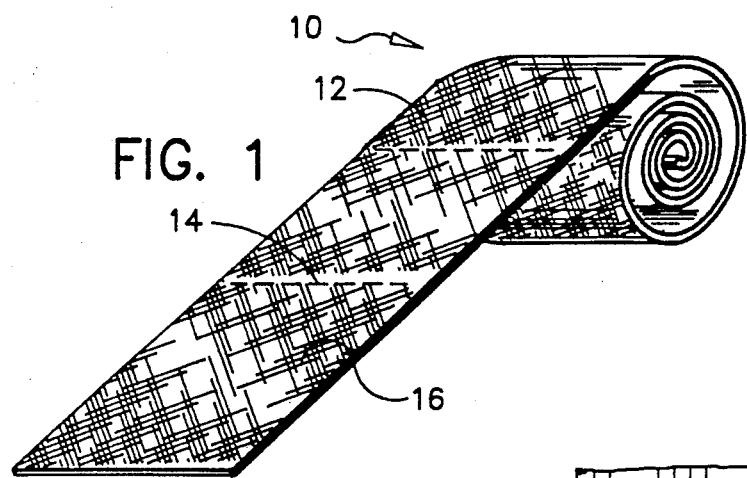
FIG. 1 is a perspective view showing a preferred embodiment of the invention.

The removal of oils and greases from water surfaces, garage floors, driveways, and the like has been an enormous problem for many years. The present invention was conceived and developed to remove certain materials, such as oils and greases, from water surfaces, concrete and other similar surfaces, and to protect floors and driveways from oil and grease drippings. It is based on the discovery that certain plant fibers, gums and mucilages, and mixtures containing these like materials are highly absorbent. These and other materials, such as plant fibers, can be coated with a water proofing coating and provide a material that will absorb oil and like materials and not absorb water.

Many plants produce gums and mucilages that are useful and have been used in the past as adhesives. Gums and mucilages are carbohydrate polymers of high molecular weight obtained from these plants.

Gums are the dried exudates from trees and shrubs produced with or without artificial stimulation by mechanical injury. Among the gums of commercial value are arabic, ghatti, karaya, and tragacanth. Some gums are completely soluble in water and others swell but do not dissolve. Still other gums exist which have two components, one of which dissolves completely while the other swells.

Plant mucilages are obtained from seeds, roots or other parts of plants by extraction with either hot or cold water. While gums form tacky or sticky solutions, mucilages give slippery or mucilaginous solutions, e.g., those from guar bean, linseed, locust bean and other related leguminous plant seeds.

The so-called seaweed mucilages or gums, such as agar, algin and carrageenin, referred to as algal polysacchrides, are obtained from various salt water algaes. One refined seaweed extract of commercial importance is sodium alginate. Gum-like polysacchrides belonging to the hemicellulose group of carbohydrate polymers have been isolated from grains such as wheat, barley, rye, oats and maize.

The invention, in its preferred form, comprises a composition containing plant fibers in admixture with a quantity of from about one percent up to one-hundred percent of an organic material selected from mucilaginous and gum materials in granular or powdered form, and coated with a waterproofing material, such asset forth in U.S. Pat. No. 3,870,425. One form of preferred fiber material is ground waste paper, including newsprint and the like. One form of preferred organic material is ground psyllium husks, which is the coating of Plantago psyllium seeds. Another preferred material is vegetable gums, such as guar, gum arabic and those discussed above also in a granular form. Other suitable materials may be obtained from seaweeds such as marine algae or kelp as further discussed above. These materials are obtained by some form of extraction processing and do not normally occur in nature in a usable form.

Other materials having similar characteristics as those discussed above, which are suitable for use in the present invention, are polysacchrides from corn, potatoes, wheat, rice, and the like. These are also obtained by some form of extraction processing and are not naturally occurring products.

The above described organic materials may be used alone or in various mixtures and combinations, but are preferably used in combination with plant fibers for most applications. Such materials can also be physically mixed in various proportions with various organic fibers or particles. Mixtures or blends of the mucilaginous/gum materials with certain plant fibers or particles, such as wood fibers, wood pulp, paper pulp, recycled paper, bagasse, grasses, rice hulls, cornhusks, and other plant fibers, afford useful compositions for absorption applications. One preferred form of the invention is a composition comprising a quantity of plant gum and/or plant mucilages in admixture with fibrous plant material in particulate form. The term admixture is used in its usual manner to mean one material physically mixed with the other. Since the ultimate composition does not occur in nature, but is physically mixed by man, it may properly be termed a synthetic composition.

The fibrous material is useful in combination with the mucilaginous and/or gum material in that it acts as a binder for the adhesive to form mat-like structures before, during or after application, which have advantages in certain applications as will be described. The absorbing compositions of the invention can be applied in particulate form, formed into mat form or into pastes and applied as will be described.

Ground Plantago psyllium husks and guar gum seeds are available from commercial suppliers who obtain them from certain Mid-Eastern countries. Ground psyllium husks have been used as an ingredient in certain foods and medications, such as Metamucil for example. Many of the mucilaginous and gum materials are highly hydrophilic and expand from twelve to twenty fold when mixed with water. In the present invention, these expanding materials have been found to have particular application drawing a liquid, such as oil, out of a material such as concrete.

Experiments carried out with plant fibers, such as paper pulp, along with a small quantity of ground Plantago psyllium husks, ground guar beans and gum powders have demonstrated the capability of these materials to absorb and extract oil and other liquids and stains from concrete, asphalt and the like. The absorbing material can be used in pure finely ground or powder form or in various combinations with other powders and fibers as will be described. The fibers are preferably plant fibers in particulate form, such as by suitable grinding or the like.

A preferred form of the material is prepared from a quantity of plant fiber in particulate form, which may be prepared in a hammer mill. A quantity of the plant fiber from any source, as described above, is fed along with a selected quantity of the gum or mucilaginous material, and is fed through a hammer mill and ground and/or thoroughly mixed. This material is them placed in a tank containing a mixture of water and sodium methyl silicate, as described in U.S. Pat. No. 3,870,425, which is incorporated herein by reference as though fully set forth. The sodium methyl silicate may be in the range of from about 6 to about 44 parts of water. A preferred range for some applications has been found to be 12 to 36 parts of water. The higher concentrations give longer lasting waterproofing. After thoroughly mixing, the material may be passed through rollers to remove most of the water and then dried, and either formed in a mat as in FIG. 1 or into a fluffy mass. The resulting mass is hydrophobic but highly oil absorbent.

EXAMPLE 1

Ground Plantago psyllium husk powder was applied over a patch of oil on a concrete surface. After several hours, it was observed that the oil from the concrete surface had been drawn into the powder. It was also observed that the powder could be handled without staining the hands, indicating that the oil had been absorbed by the powder.

EXAMPLE 2

A powder of ground guar seed was applied to a patch of concrete, as in the previous example. The results were similar to those obtained in the previous example, with the powder absorbing the oil from the concrete surface, which was left clean and free of any oily residue.

Similar applications have been made to asphalt surfaces with the powder removing oil patches from such surfaces.

EXAMPLE 3

A quantity of oil was poured on the surface of a body of salt water (seawater). A quantity of ground waste paper was prepared by agitation in a tank of water solution and sodium methyl silicate, as described above, and then dried producing a fluffy fibrous mass. The concentrations varied from 6 parts water to 36 parts water with effectiveness. The material in this form was applied to cover the floating oil. The absorbing material was observed to completely absorb the oil in a short period of time (about five minutes), while continuing to float on top of the body of water. Other similar experiments were conducted, both with and without the mixture containing mucilages, such as ground guar seeds in a powder form with the same results. The material readily absorbs the oil without absorbing more than a very minor amount of water.

EXAMPLE 4

A mixture of psyllium husk powder and paper mulch was prepared. The paper mulch was waste paper in the form of newsprint that had been ground in a hammer mill along with the psyllium husks to a fine fiber. The mixture was placed in the waterproofing solution and processed as described above to form a fibrous mass. This mixture was placed over an oil patch on a body of water. The material was left to soak up the oil for a period of a few hours. Upon removal of the material, the oil was observed to have been completely absorbed from the water surface, without an appreciable amount of water being absorbed This indicates a suitability for oil spills wherein the material can be left for several hours before pickup without absorbing an appreciable amount of water.

Other similar experiments have been carried out wherein the absorbing compositions contained only about one to five percent psyllium husk powder. These compositions were also found to be successful in removing surface oil from the surfaces of water surfaces and the like.

The materials described above and various mixtures thereof may be formed into a paste by the addition of water or the like and applied to various surfaces for the removal or capture of oils and other liquids. For example, a paste of the material may be placed around leaking pipes or pipe joints to absorb oil leaks.

Referring to FIG. 1 of the drawing, there is illustrated a physical embodiment with the materials of the present invention formed, for example, into thin sheets that may be used as will be described. As shown in FIG. 1, the roll, designated generally by the numeral 10, comprises an elongated continuous sheet 12 of material composed of a composition of one or more of the mucilaginous or gum materials and a fibrous material mixed and wetted with waterproofing solution, for example, and drawn through rollers to form a continuous mat. The sheet is preferably scored, such as by perforations or the like 14, to enable it to be separated into discrete sheets 16, for example.

Figure 2:
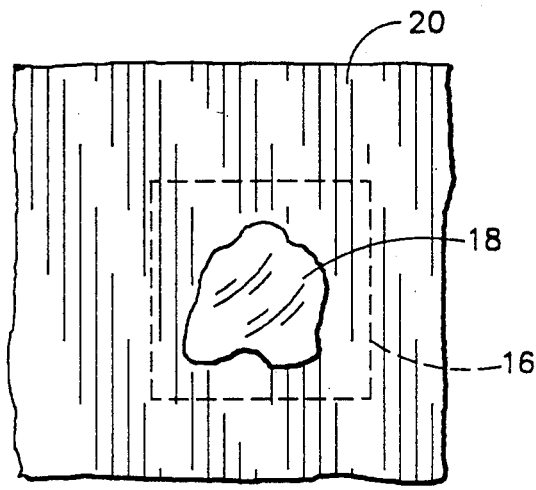
FIG. 2 is a top plan view showing an application of the embodiment of FIG. 1.

The sheets 16 may be separated from the roll and may be placed over an oil spill or spot 18 on the surface of a slab 20, as shown in FIG. 2, for example. The sheet 16 may be placed as shown by the broken line outline 16 over the oil spot or spill 18. The mat thus utilized may cover and absorb the oil spot.

Figure 3:
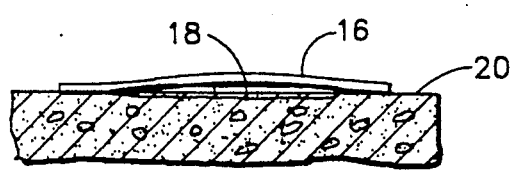
FIG. 3 is a side elevation view, in section, showing a further stage in the application of FIG. 2.

In a similar manner as will be observed in FIG. 3, the mat may be placed in or underneath machinery, automobile engines and the like to catch drippings from the engine and/or transmission. These mats may also be placed out doors where they may absorb oil without absorbing water from rain and snow and the like. Thus, the mats may be fabricated into sheets as thin as one-eighth inch or as thick as one to two inches for various purposes. The sheets may be utilized as protective covers for placement on the floors in garages and the like. When the sheet becomes overly saturated, at least in portions, it may be removed and replaced. It is also contemplated that the materials may be recycled in some manner by removal and recovery of the oil therein.

Figure 4:
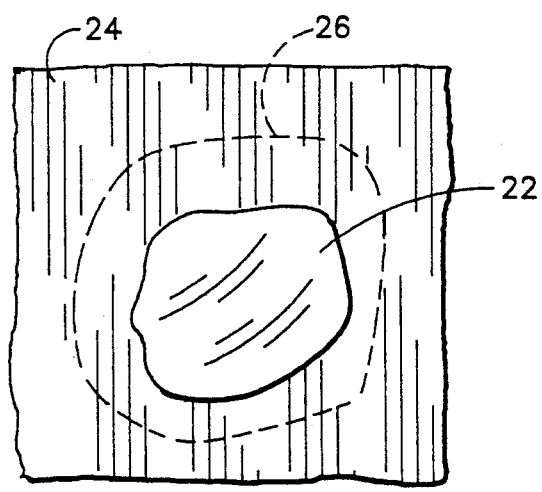
FIG. 4 is a view like FIG. 2 showing an alternate embodiment and form of application.
Figure 5:
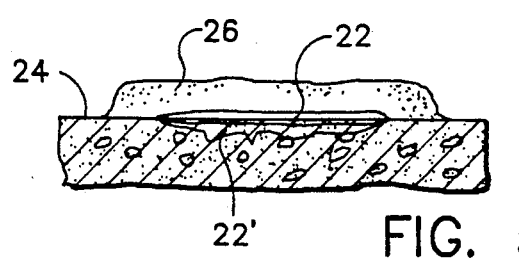
FIG. 5 is a view like FIG. 3 showing an alternate embodiment and further stage of application.

Referring to FIGS. 4 and 5, there is illustrated an example of the utilization of the absorbing materials described herein as a fluffy fibrous mass or as a paste. Referring to FIG. 4, for example, an oil or other liquid spot or puddle 22 is shown on a surface 24 of concrete or the like. A quantity of the absorbing material, as described above, is selected and then spread, as shown in FIG. 5, in a layer 26 over the oil spot. The material covers an area, as shown for example in FIG. 4, by the dotted or broken line.

Shown below the surface of the slab or block 24 is a stain portion of the oil or liquid puddle 22, which has seeped into the pores of the slab 24. The material as a paste 26 will function to draw out and absorb the liquid material 24 on the surface of the slab 24 and also the stain material 22' beneath the slab surface.

In accordance with an additional novel aspect of the present invention, the composition is made impervious to water while maintaining its affinity for oils. This is carried out by a process of waterproofing the composition with a material that does not prevent its absorption of oil. The process comprises the treatment of the material or composition, with a chemical solution that changes it from a hydrophylic to a hydrophobic nature. One preferred form of treatment is as disclosed in U.S. Pat. No. 3,870,425, granted Mar. 11, 1975, to George Peter Karonis, and entitled "DRY SOIL PROCESS". Other suitable waterproofing materials include but are not limited to those sold under the following trademarks: "Water Tect", Thompsons Water Seal", "Fight Back", "Con Spect", Aqua Mix", all available as liquids for waterproofing purposes. Some of these, however, may not be suitable for certain applications due to environmental factors.

While I have illustrated and described my invention by means of numerous examples and specific embodiments, it is to be understood that numerous modifications and changes may be made therein without departing from the spirit and scope of the invention as defined in the appended claims.

I claim:

1. A hydrophobic composition for absorbing a hydrocarbon liquid, said composition comprising a fibrous plant material coated with a hydrophobic coating of sodium methyl silicate that is pervious to hydrocarbon liquids.

2. A composition according to claim 1 wherein said fibrous material is selected from the group consisting of wood fibers, bagasse, grass, rice hulls and corn husks.

3. A composition according to claim 1 wherein said composition further comprises a component of organic material selected from the group consisting of plant gums and mucilages, wherein said mucilages are derived from plants selected from the group consisting of guar, Plantago, salt water algae, seaweed mucilages and from grains; and said plant gums are selected from the group consisting of arabic, ghatti, karya and tragacanthplant mucilages and are derived from plants selected from the group consisting of guar, Plantago and salt water algae.

4. A composition according to claim 3 wherein said organic material comprises from about five to about twenty-five percent by weight of said composition.

5. A composition according to claim 1 wherein said composition is in the form of a sheet.

6. A hydrophobic composition for absorbing oils, said composition comprising:

a quantity fibrous material selected from the group consisting of wood fibers, bagasse, grass, rice hulls and corn husks;

an organic material derived from at least one substance selected from the group consisting of plant gums and plant mucilages, said organic material in admixture with a fibrous material; and a coating of sodium methyl silicate material on said mixture that is pervious to oils.

7. A process for moving a liquid hydrocarbon substance from a medium supporting said substance comprising:

providing a composition for absorbing a liquid hydrocarbon substance, said composition comprising a quantity of fibrous material selected from the group consisting of wood fibers, bagasse, grass, rice hulls and corn husks, having a coating of sodium methyl silicate; and contacting said liquid substance with said absorbing composition for a period of time sufficient to allow the liquid hydrocarbon substance to be bound by said absorbing composition.

8. A process according to claim 7 wherein said absorbing composition further comprises an organic material derived from at least one substance selected from the group consisting of plant gums and plant mucilages, said plant gums selected from the group consisting of arabic, ghatti, karya and ragacanth, and said plant mucilages are derived from plants selected from the group consisting of guar, Plantago and salt water algae.

9. A process according to claim 7 wherein said absorbing composition comprises plant mucilages that are derived from plants selected from the group consisting of guar, Plantago and salt water algae.

10. A process according to claim 7 further comprising admixing said composition with a fibrous material prior to contacting said liquid substance.

11. A process according to claim 1 where said fibrous plant material is made by a process of selecting a quantity of ground waste paper, agitating the ground waste paper in a liquid containing a hydrophobic solution, and drying the fibrous plant material in a manner to produce a fluffy fibrous mass having a coating that is pervious to oils.

* * * * *